US005357853A

United States Patent [19]

Nelson et al.

[11] Patent Number: 5,357,853

[45] Date of Patent: Oct. 25, 1994

[54] SPIT SUPPORTED MEAT SLICING APPARATUS

[75] Inventors: William J. Nelson; Peter Kjeer, both of Mankato, Minn.

[73] Assignee: Tack Room Imports, Inc., Mankato, Minn.

[21] Appl. No.: 44,005

[22] Filed: Apr. 8, 1993

[51] Int. Cl.[5] ........................ A22C 17/02; A47J 37/04

[52] U.S. Cl. ........................................ 99/538; 99/537; 99/421 V

[58] Field of Search ................. 99/538, 537, 541, 593, 99/594, 491, 492, 595-599, 589, 421 V, 421 R; 83/563, 485, 487, 932, 614; 426/518, 523

[56] References Cited

U.S. PATENT DOCUMENTS

| | | | |
|---|---|---|---|
| 3,153,436 | 10/1964 | Chesley | 99/538 |
| 3,951,054 | 4/1976 | Frentzel | 99/538 |
| 4,050,370 | 9/1977 | Schmidt et al. | 99/538 |
| 4,170,174 | 10/1979 | Ditty et al. | 99/538 |
| 4,300,443 | 11/1981 | Morcos et al. | 99/421 V |
| 4,332,190 | 6/1982 | Mart | 99/538 |
| 4,386,560 | 6/1983 | Ditty | 99/538 |
| 4,441,411 | 4/1984 | Mullins, Jr. | 99/537 |
| 4,821,635 | 4/1989 | Logan, Jr. | 99/538 |
| 5,251,543 | 10/1993 | Brothers | 99/419 |

*Primary Examiner*—David A. Scherbel
*Assistant Examiner*—Patrick F. Brinson
*Attorney, Agent, or Firm*—Jacobson, Price, Holman & Stern

[57] ABSTRACT

An upstanding support is provided from which an upstanding threaded shaft is supported in horizontally spaced relation relative to the upstanding support. The upper and lower ends of the threaded shaft are guidedly supported from the upstanding support for movement toward and away from the latter, rotary circular cutting blade structure is mounted from the screw shaft for movement up and down along the latter and structures provided whereby the upper and lower ends of the screw shaft may be independently and/or simultaneously shifted toward and away from the upstanding support.

13 Claims, 2 Drawing Sheets

SPIT SUPPORTED MEAT SLICING APPARATUS

BACKGROUND OF THE INVENTION

1. Field of the Invention

This invention relates to a meat slicing apparatus to be used in conjunction with a vertical spit and wherein as the spit gradually turns a large vertically elongated piece of meat from which substantially vertical slices of meat may be cut evenly therefrom in an automatic matter. The spit has heat generating structure operatively associated therewith on a side thereof remote from the meat slicing apparatus whereby each layer of meat to be sliced from the remaining piece of meat may be heated and rotation of the spit supported meat may be accomplished in an intermittent manner, if desired, such that the spit supported meat will be held stationary during each meat slicing operation.

2. Description of Related Art

Various different forms of meat cutting machines and vertical rotisseries heretofore have been provided. Examples of such devices including some of the general structural and operational features of the instant invention are disclosed in U.S. Pat. Nos. 2,210,765, 3,604,341, 3,956,979, 4,780,930 and 5,069,652.

However, these previously known devices do not include the overall combination of structural and operational features of the instant invention which enables a vertical spit supported and vertically elongated piece of meat to have slices of meat evenly cut therefrom with each sliced portion of meat being preheated.

SUMMARY OF THE INVENTION

The meat slicing apparatus of the instant invention is designed specifically to be used in conjunction with a vertical spit rotisserie including drive structure for continuously (or intermittently) rotary driving the supported piece of meat relative to heat generating structure in a manner such that each portion of meat to be sliced from the remaining body of meat will have been immediately previously heated.

Further, the invention incorporates a meat slicing apparatus whose path of movement may be inclined relative to the vertical in order to accommodate a vertically tapering piece of meat supported on the vertical spit type rotisserie. Also, the meat slicing apparatus may be controlled to cut slices of different thicknesses, as desired and in a substantially unattended manner.

The main object of this invention is to provide a meat slicing apparatus usable in conjunction with a vertical spit type rotisserie and for the purpose of slicing meat from a vertically elongated piece of meat supported from the spit type rotisserie.

Another object of this invention is to provide a meat slicing apparatus whose slicing strokes may be inclined relative to the vertical according to the taper of the piece of meat being sliced.

Still another important object of this invention is to provide a meat slicing apparatus which will perform the desired meat slicing operation in a substantially unattended manner.

Another very important object of this invention is to provide a meat slicing apparatus in conjunction with a vertical spit type rotisserie including meat heating structure whereby the meat to be sliced from the remainder of the body of meat on the vertical spit may be heated immediately prior to being sliced.

Still another object of this invention is to provide a meat slicing apparatus which will provide more uniform slices of meat than can be obtained by hand.

A further object of this invention is to provide a meat slicing apparatus which may be adapted for use in conjunction with different vertical spit type rotisseries.

A final object of this invention to be specifically enumerated herein is to provide a meat slicing apparatus in accordance with the preceding objects and which will conform to conventional forms of manufacture, being of simple construction and easy to use so as to provide a device that will be economically visible, long lasting and relatively trouble free in operation.

These together with other objects and advantages which will become subsequently apparent reside in the details of construction and operation as more fully hereinafter described and claimed, reference being had to the accompanying drawings forming a part hereof whereof like numerals refer to like parts throughout.

DESCRIPTION OF THE PREFERRED EMBODIMENT

Figure 1:
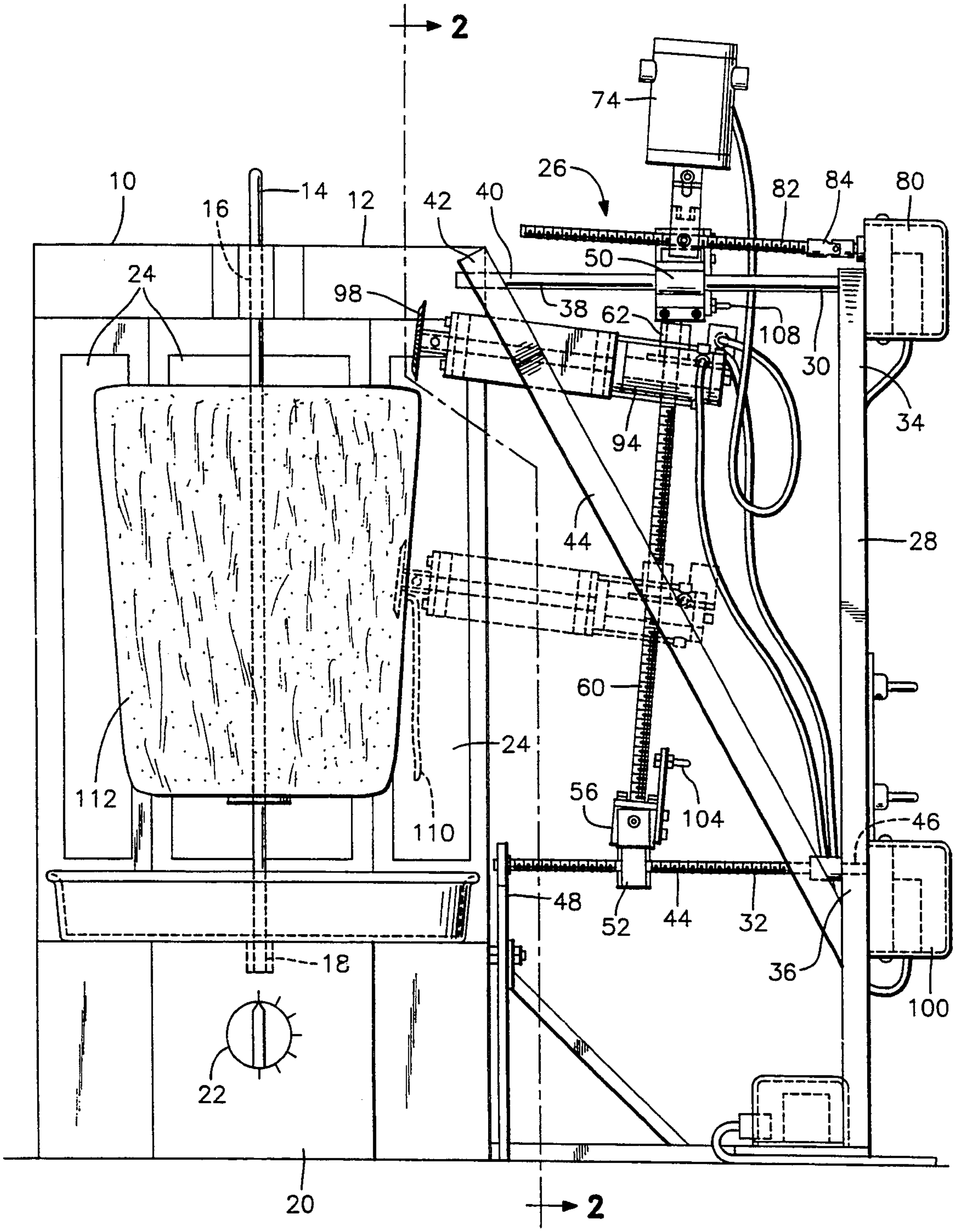
FIG. 1 is a side elevational view of the meat slicing apparatus of the instant invention in operative association with a vertical spit type rotisserie and with an alternate position of the meat slicing head of the apparatus illustrated in phantom lines.
Figure 2:
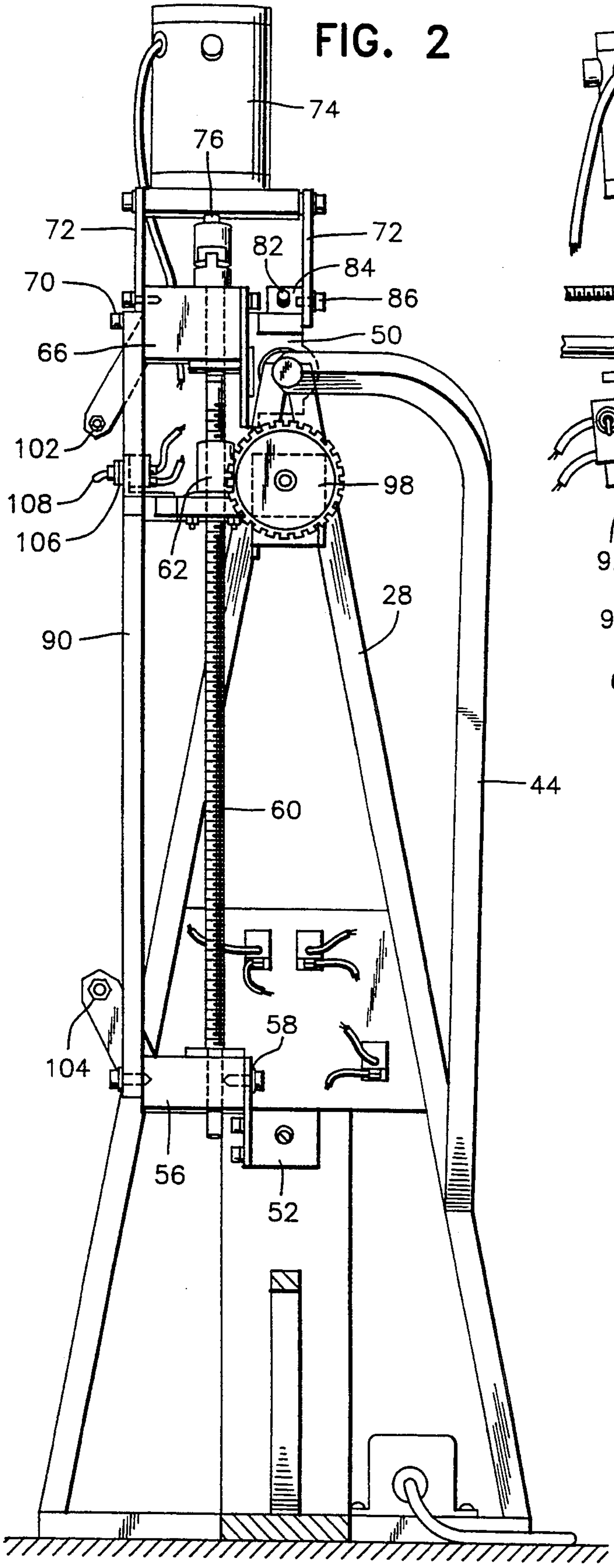
FIG. 2 is an enlarged vertical sectional view taken substantially upon the plane indicated by the section line 2—2 of FIG. 1.
Figure 3:
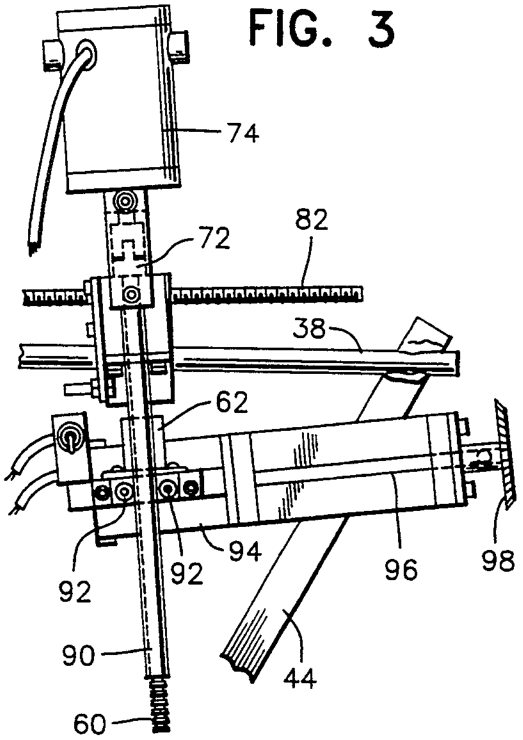
FIG. 3 is a fragmentary enlarged elevational view of the structure shown in the upper right hand portion of FIG. 1 as seen from the rear side thereof.
Figure 4:
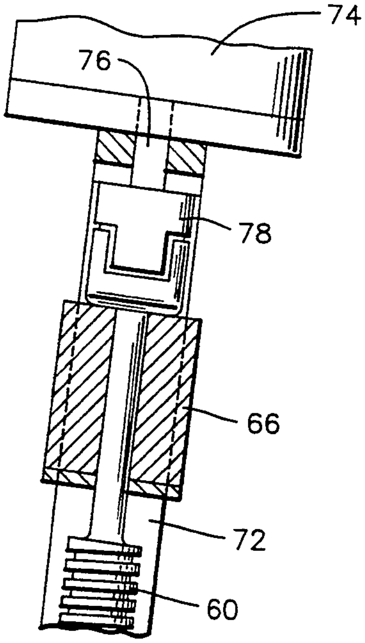
FIG. 4 is a fragmentary enlarged vertical sectional view illustrating the manner in which one of the electric motors is drivingly coupled to the upstanding screw shaft from which the meat cutting structure is supported.

Referring now more specifically to the drawings the numeral 10 generally designates a conventional form of vertical spit rotisserie including a housing 12 from which a vertical spit 14 is removably journaled as at 16 and 18, the lower end of the spit 18 being driven by an electric motor assembly 20 including a variable speed control 22. In addition, the rotisserie or vertical broiler includes vertical heating elements 24 and the broiler includes an automatic slip clutch which stops rotation of the spit 14 during a slicing operation. The vertical broiler 10 may be of the type marketed under the name "Auto Doner" and manufactured by Optimal Automatics Corp. of Chicago, Ill. Further, other types of vertical broilers may be used in conjunction with the meat slicing apparatus of the instant invention.

The meat slicing apparatus is referred to in general by the reference numeral 26 and includes an upstanding support frame 28 including elongated upper and lower supports 30 and 32 projecting outwardly from upper and lower portions 34 and 36 of the support frame.

The upper support 30 includes a smooth support shaft 38 which has one end anchored relative to the support frame 28 and the other outer end 40 anchored to the upper end portion 42 of an inclined brace 44 extending downwardly and secured to the lower portion 36 of the support frame 28. The lower support 32 comprises an electric motor driven screw shaft 44 journaled from the lower portion 36 as at 46 at one end and journaled from an upright support 48 at its other end. The support frame 28 is disposed adjacent the vertical broiler 10 at one side thereof remote from the heating elements 24 and the support shaft 38 has a follower 50 disposed thereon for guided movement therealong while the screw shaft 44 has a follower 52 threadedly engaged thereon.

The follower 52 oscillatably supports a journal 56 therefrom by a pivot fastener 58 for oscillation about a horizontal axis and the journal 56 rotatably journals the lower end of a vertical screw shaft 60 therefrom having a threaded follower 62 threadedly engaged thereon for movement up and down the screw shaft 60 in response to rotation thereof.

The follower 50 pivotally supports a journal 66 therefrom and the upper end of the screw shaft 60 is journaled from the journal 66, the journal 66 being pivotally supported from the follower 50 as at 70 and a motor support bracket assembly 72 supports an electric motor 74 including an output shaft 76 aligned with the screw shaft 60 and coupled thereto by means of a dog clutch assembly 78 allowing for relative axial shifting between the output shaft 76 and the screw shaft 60. Also, a second electric motor 80 is supported from the upper portion of the support frame 28 and includes an output shaft drivingly coupled to one end of a third screw shaft 82 through a universal joint 84 and the screw shaft 82 is threaded engaged through a threaded follower 84 pivotally supported from the motor support bracket assembly 72 as at 86.

A guide rod 90 extends between and is secured to the journals 56 and 60 and the follower 62 includes rollers 92 journaled therefrom which rollingly engage opposite sides of the guide rod 90, an electric motor 94 being supported from the follower 62 and including a rotary output shaft 96 upon which a rotary cutter wheel 98 is mounted.

The screw shaft 44 is driven by yet another electric motor 100 and each of the motors 80 and 100 may be independently or simultaneously actuated by any suitable controls. Thus, the inclination of the screw shaft 60 may be varied as desired. Furthermore, the motor 74 is of the reversible type and the upper and lower journals 66 and 56 include upper and lower abutments 102 and 104 which are engageable by a toggle switch carried by the follower 62 operable to reverse operation of the motor 74.

As the motor 74 rotates the shaft 60 in one direction, the follower 62 moves upwardly along the shaft 60 until the toggle switch actuator 108 engages the abutment 102. Then, operation of the motor 74 is reversed to cause downward movement of the follower 62 along the shaft 60 until such time as the toggle switch actuator 108 engages the abutment 104 to again reverse operation of the motor 74.

If it is desired, the motor assembly 20 for rotating the spit 14 may include a control by which the spit 14 is only intermittently rotated a predetermined amount as the follower 66 reaches the upper and lower limits of its travel. In this manner, constant thickness elongated strips 110 of meat may be cut from the body 112 of meat supported from the spit 14. Also, the axis of rotation of the cutting wheel 98 may be slightly angulated relative to the cut surface of the body 112 of meat such that the rotary cutting blade 98 will cut the meat only during downward movement of the cutting blade 98. In this instance, the motors 80 and 100 also will be intermittently operated to move the screw shaft 60 toward the body 112 of meat only as the follower 62 reaches its upward limit of movement and before subsequent downward movement of the follower 62 sufficient to engage the blade 98 with the body 112 of meat has been carried out.

If it is desired, the portion 48 of the support frame 28 may be anchored relative to the vertical rotisserie or broiler, but it has been found that merely placing both the vertical broiler and the meat slicing apparatus 26 on the same horizontal support surfaces is sufficient to maintain the two in operative position relative to each other.

It is to be noted that the spit 14 turns in a clockwise direction as viewed from the upper end thereof such that meat which is just passed by the heating elements 24 will be heated. Thus, the meat strips 110 cut from the body 112 of meat will have been just previously heated.

It will be noted that the motors 80 and 100 are gear head motors and thus turn the shafts 44 and 82 at slow speeds while the motor 74 turns the shaft 60 at a relatively high speed such that the follower 62 and cutting blade 98 will rapidly traverse downwardly along the outer surface of the body 112.

The foregoing is considered as illustrative only of the principles of the invention. Further, since numerous modifications and changes readily will occur to those skilled in the art, it is not desired to limit the invention to the exact construction and operation shown and described and, accordingly, all suitable modifications and equivalence may be resorted to, falling within the scope of the invention.

What is claimed as new is as follows:

1. A meat slicing apparatus comprising: an upstanding support, said upstanding support including upper and lower portions; elongated upper and lower supports projecting outwardly from one side of said upper and lower portions, respectively, of said upstanding support; an upstanding guide structure including upper and lower ends supported from and guidingly movable along said upper and lower supports, respectively; a cutting assembly mounted from said guide structure for guided movement therealong and operable to make cuts in an upstanding plane disposed transverse to said upper and lower supports; first drive means operable to gradually shift said upper and lower ends along said upper and lower supports and second drive means operable to shift said cutting assembly up and down said guide structure.

2. The meat slicing apparatus of claim 1 wherein said first drive means includes means operable to selectively and simultaneously shift said upper and lower ends along said upper and lower supports.

3. The meat slicing apparatus of claim 1 including a upstanding rotary spit adapted to support a vertically elongated piece of meat therefrom and relative to which said apparatus is stationarily supported for making slicing cuts on said piece of meat, said spit including means operative to slowly rotate said spit.

4. The meat slicing apparatus of claim 3 wherein said apparatus is disposed to one side of the axis of rotation of said spit and said spit includes heating means for heating a side of said piece of meat remote from said one side.

5. The meat slicing apparatus of claim 1 wherein said lower support includes a first motor driven screw shaft having a first threaded follower threaded thereon and said upstanding guide structure includes a second motor driven upstanding screw shaft having upper and lower ends, said lower end of said second shaft being journaled in a first journal member pivotally supported from said first threaded follower for angular displacement about a generally horizontal axis generally paralleling said plane, said cutting assembly including a second threaded follower threadingly mounted from said second screw shaft for movement therealong.

6. The meat slicing apparatus of claim 5 wherein said upper support includes a third motor driven screw shaft having a third threaded follower threaded thereon from which a second journal member is mounted for angular displacement about an axis generally paralleling said horizontal axis.

7. The meat slicing apparatus of claim 1 wherein said second drive means includes deactivatable control means operative to repeatedly shift said cutting assembly up and down said guide structure along a path of predetermined length.

8. The meat slicing apparatus of claim 7 wherein said first drive means includes means operable to selectively and simultaneously shift said upper and lower ends along said upper and lower supports.

9. The meat slicing apparatus of claim 7 including a upstanding rotary spit adapted to support a vertically elongated piece of meat therefrom and relative to which said apparatus is stationarily supported for making slicing cuts on said piece of meat, said spit including means operative to slowly rotate said spit.

10. The meat slicing apparatus of claim 9 wherein said apparatus is disposed to one side of the axis of rotation of said spit and said spit includes heating means for heating a side of said piece of meat remote from said one side.

11. A meat slicing apparatus for slicing strips of meat from a vertically elongated body of meat supported from a vertical spit comprising: an upstanding support, said support including upper and lower portions, for disposition outwardly of one side of said spit and from which an upstanding threaded shaft is supported in horizontal spaced relation relative to said upstanding support, said threaded shaft including upper and lower ends guidingly supported from said respective upper and lower portions, of said upstanding support; drive means for selective and simultaneous movement of said upper and lower ends of the threaded shaft toward and away from said upstanding support; a reversible motor means drivingly coupled to said threaded shaft, and a rotary circular cutting blade structure mounted from said threaded shaft for up and down movement therealong in response to reversed rotation of said shaft by said reversible motor means.

12. The meat slicing apparatus of claim 11 including control means operative to effect reverse operation of said motor means responsive to said rotary circular cutting blade structure being shifted along said screw shafts to predetermined upper and lower limits of movement of said cutting blade structure.

13. A meat slicing apparatus comprising: an upstanding support for rotatably supporting a body of meat therefrom for angular displacement about an upstanding axis; an upstanding guide having upper and lower ends; mounting means mounting said guide relative to said support at a position horizontally spaced to one side thereof; drive means for selective adjustment of said upper and lower ends, independently and in unison, toward and away from said one side of said support, and a motor driven slicing assembly controllably and guidingly mounted from said guide for up and down movement therealong throughout a path of predetermined length, said slicing assembly including cutting blade means for making cuts in a direction paralleling said path.

* * * * *